(12) United States Patent
Yensho

(10) Patent No.: US 8,376,104 B2
(45) Date of Patent: Feb. 19, 2013

(54) CLUTCH PLATE WITH SLOTS

(75) Inventor: Nathan Yensho, Norton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 218 days.

(21) Appl. No.: 12/868,463

(22) Filed: Aug. 25, 2010

(65) Prior Publication Data

US 2011/0048883 A1    Mar. 3, 2011

Related U.S. Application Data

(60) Provisional application No. 61/237,423, filed on Aug. 27, 2009.

(51) Int. Cl.
*F16D 33/00* (2006.01)

(52) U.S. Cl. ...................................................... 192/3.29

(58) Field of Classification Search .......... 192/3.28–3.3, 192/70.16, 70.19
See application file for complete search history.

(56) References Cited

U.S. PATENT DOCUMENTS

| | | | |
|---|---|---|---|
| 5,826,688 A * | 10/1998 | Arhab et al. ................. | 192/3.29 |
| 5,896,970 A * | 4/1999 | Prater | |
| 5,906,135 A * | 5/1999 | Prater | |
| 6,102,174 A * | 8/2000 | Sasse ........................... | 192/3.28 |
| 7,073,646 B2 * | 7/2006 | Sasse et al. .................. | 192/3.29 |
| 2007/0193850 A1 | 8/2007 | Sturgin et al. | |
| 2008/0190723 A1 * | 8/2008 | Heck et al. ................... | 192/3.29 |
| 2009/0032351 A1 * | 2/2009 | Uhler ........................... | 192/3.29 |
| 2009/0110475 A1 * | 4/2009 | Soto et al. | |
| 2009/0125202 A1 * | 5/2009 | Swank et al. ............ | 192/3.29 X |
| 2009/0205916 A1 * | 8/2009 | Peri .............................. | 192/3.29 |

* cited by examiner

*Primary Examiner* — Gregory Binda
*Assistant Examiner* — Josh Skroupa
(74) *Attorney, Agent, or Firm* — Simpson & Simpson, PLLC

(57) ABSTRACT

A torque converter clutch assembly including a torque converter cover drivingly engaged with a prime mover, a piston plate for engaging the clutch; a drive plate; and a drive ring drivingly engaged with the drive plate. The drive ring has a continuous ring-shaped segment at its outer circumference, and a radial friction wall. The drive plate is disposed axially between the radial friction wall and the ring-shaped segment. In some example embodiments of the invention, the drive plate includes at least one tab with an outer diameter and the ring-shaped segment includes an inner diameter larger than the tab outer diameter.

12 Claims, 5 Drawing Sheets

US 8,376,104 B2

CLUTCH PLATE WITH SLOTS

CROSS-REFERENCE TO RELATED APPLICATIONS

This application claims the benefit under 35 U.S.C. §119 (e) of U.S. Provisional Application No. 61/237,423, filed Aug. 27, 2009 which application is incorporated herein by reference.

FIELD OF THE INVENTION

The invention relates generally to a clutch assembly for a torque converter, and more specifically to a clutch plate with slots.

BACKGROUND OF THE INVENTION

Clutch housings with slots are known. One example is shown in commonly owned US Patent Publication 2007/0193850.

BRIEF SUMMARY OF THE INVENTION

Example aspects of the present invention broadly comprise a torque converter clutch assembly including a torque converter cover drivingly engaged with a prime mover, a piston plate for engaging the clutch, a drive plate, and a drive ring drivingly engaged with the drive plate. The drive ring has a continuous ring-shaped segment at its outer circumference, and a radial friction wall. The drive plate is disposed axially between the radial friction wall and the ring-shaped segment. In some example embodiments of the invention, the drive plate includes at least one tab with an outer diameter and the ring-shaped segment includes an inner diameter larger than the tab outer diameter.

In an example embodiment of the invention, the drive ring includes at least one slot for engaging the at least one drive plate tab. The radial height of the slot varies in an axial direction. In another example embodiment of the invention, the drive ring includes at least one recess for engaging the at least one drive plate tab. The radial depth of the recess varies in an axial direction. The at least one recess includes a lanced edge for engaging the at least one drive plate tab and the radial height of the lanced edge varies in an axial direction.

In some example embodiments of the invention, the drive ring includes at least one friction ring bonded to the radial friction wall. In an example embodiment of the invention, the drive ring includes two friction rings disposed on axially opposing surfaces of the radial friction wall.

Other example aspects of the present invention broadly comprise a drive ring for a torque converter clutch including a radial friction wall, an axial ring circumferentially continuous around an outer circumference of the drive ring, and a tab engagement section. The tab engagement section includes a plurality of slots for rotationally engaging a plurality of drive plate tabs. The tab engagement section is disposed between the radial friction wall and the axial ring.

In an example embodiment of the invention, the tab engagement section has a conical shape. The axial ring has an inner diameter and the axial ring inner diameter is greater than an outer diameter for the plurality of drive plate tabs. The tab engagement section has a first axial length and the axial ring comprises a second axial length less than the first axial length. In an example embodiment of the invention, the drive ring further includes at least one friction ring bonded to the radial friction wall.

Other example aspects of the present invention broadly comprise a method of forming a drive ring for a torque converter clutch including the steps of piercing a blank having an outer diameter, piercing an inner diameter out of the blank, punching a tab engagement slot at a predetermined distance inside of the outer diameter, and axially forming the drive ring so that a radial height of the slot varies in an axial direction.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
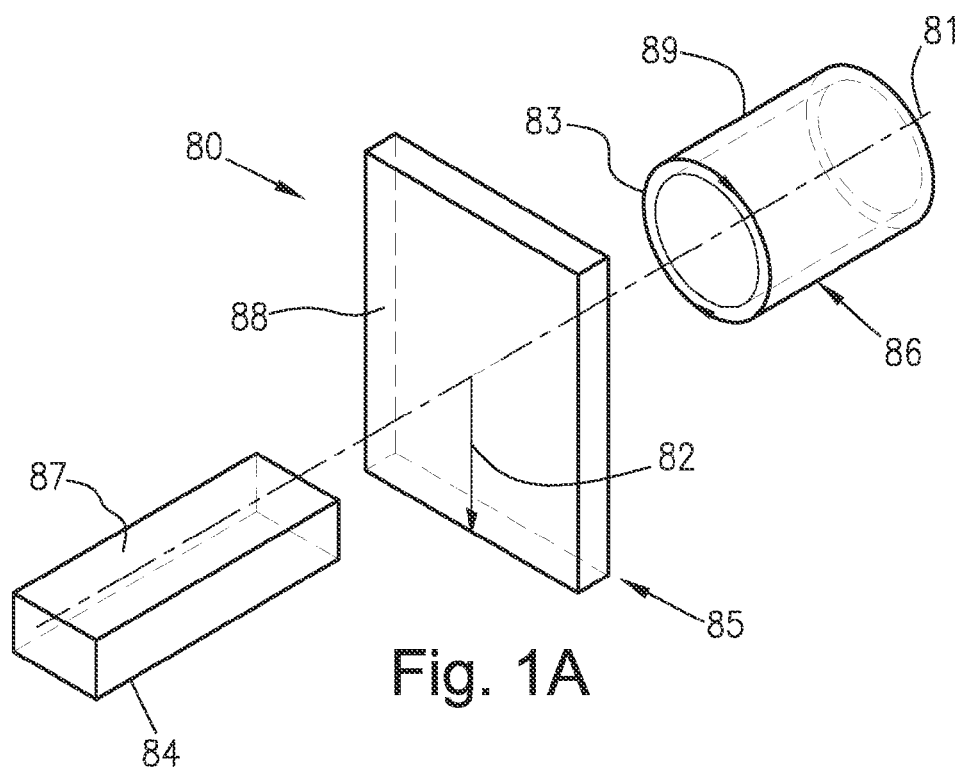
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
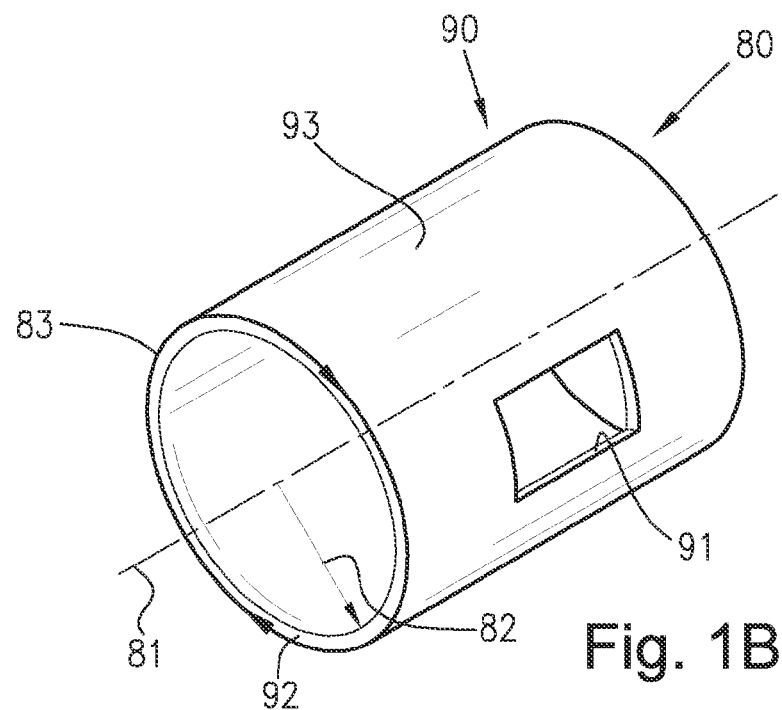
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
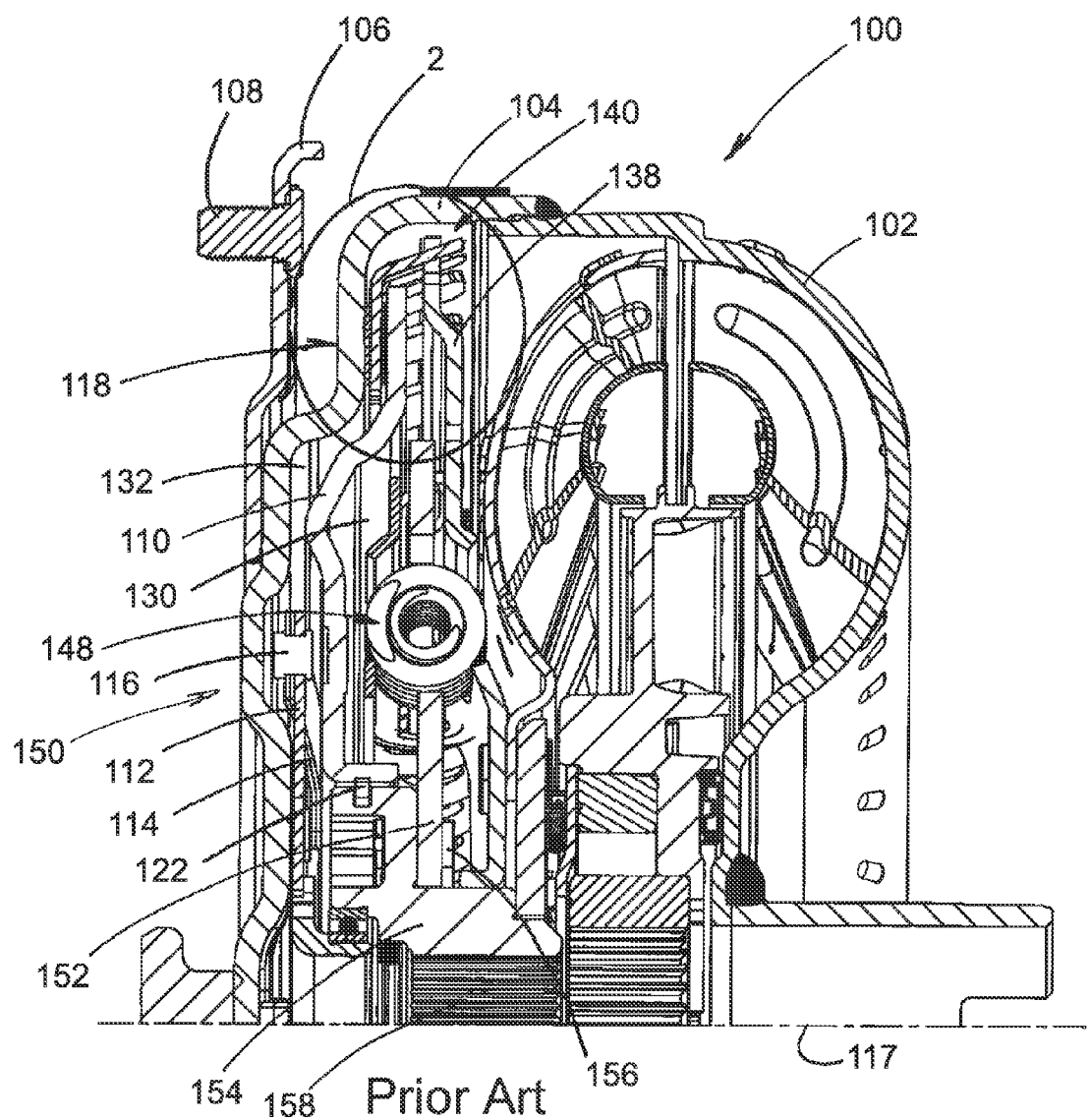
FIG. 2 is a cross-sectional view of a prior art torque converter.
Figure 3:
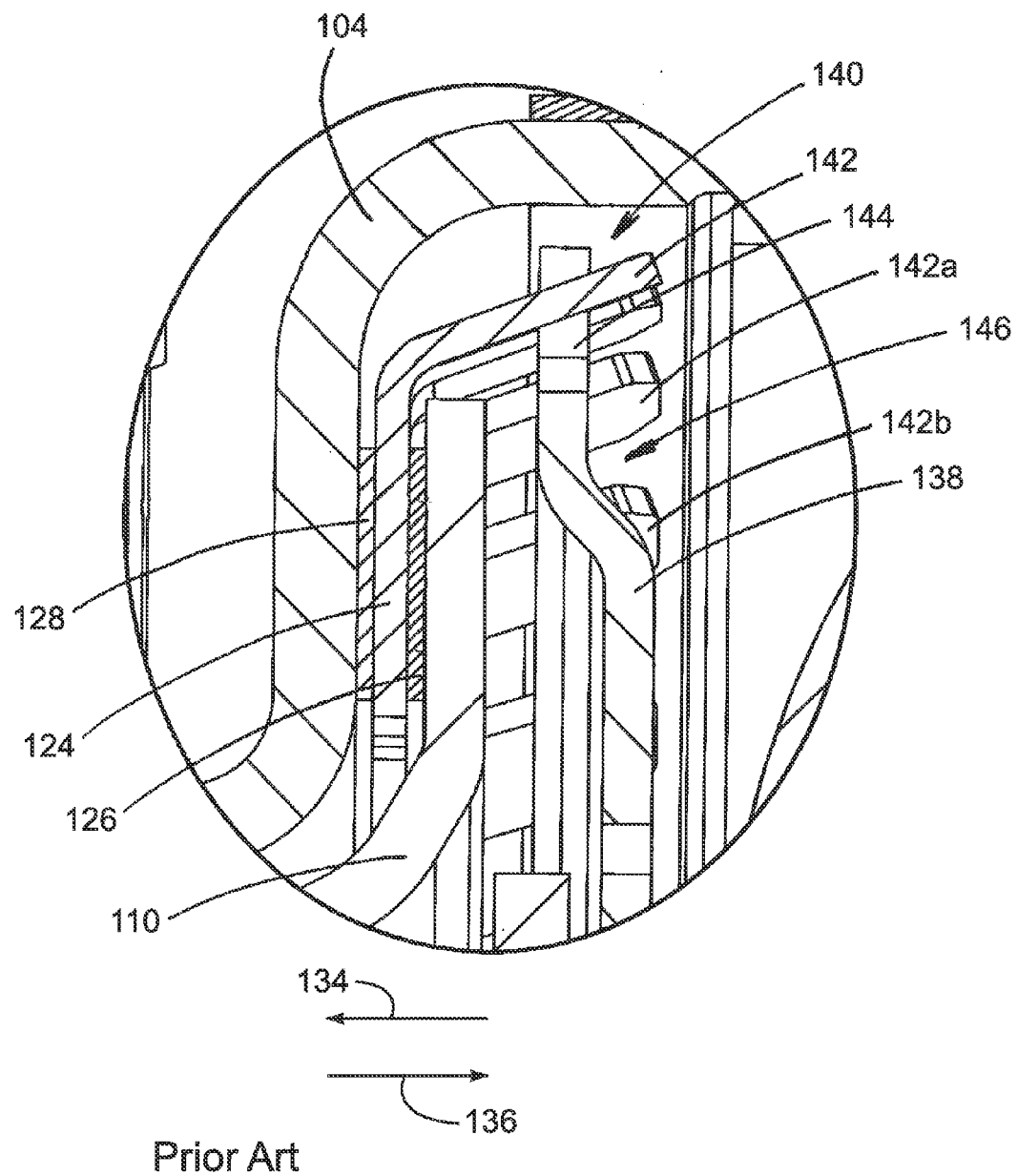
FIG. 3 is a detail view of encircled region 3 in FIG. 2.

The following description is made with reference to FIGS. 2-3. FIG. 2 is a cross-sectional view of a prior art torque converter. FIG. 3 is a detail view of encircled region 3 in FIG. 2. Prior art torque converter 100 includes pump 102 and cover 104. Cover 104 is drivingly engaged with a prime mover (not shown) using any means known in the art. For example, cover 104 may be engaged to a flexplate of a combustion engine (not shown) through stud plate 106 and studs 108.

Piston plate 110 is drivingly engaged with cover 104 through drive plate 112 and leaf springs 114. Drive plate 112 is fixedly attached to cover 104 by riveting, for example. Each of leaf springs 114 is secured to piston plate 110 at a first end and drive plate 112 at a second end. Leaf springs 114 may be secured to drive plate 112 by rivet 116, for example. Axial flexibility of leaf springs 114 allow movement of piston 110 along torque converter central axis 117.

Piston plate 110 is arranged to engage clutch assembly 118. Piston plate 110 is sealed to hub 154 with dynamic seal 122 and to drive ring 124 with friction ring 126. Drive ring 124 is sealed to cover 104 with friction ring 128. Therefore, piston plate 110 divides apply chamber 130 and release chamber 132. When pressure in apply chamber 130 exceeds pressure in release chamber 132, piston plate 110 is urged in direction 134 to engage clutch 118. Likewise, when pressure in chamber 132 is higher, piston plate 110 is urged in direction 136 and clutch 118 is disengaged.

Drive ring 124 is engaged with drive plate 138 at tabbed connection 140. Drive ring 124 includes angular tabs 142 and drive plate 138 includes radial tabs 144. Tabs 142 are discontinuous about a circumference of drive ring 124. That is, at least one circumferential gap 146 is present between adjacent tabs, for example, tabs 142a and 142b. Therefore, individual tabs such as tabs 142a and 142b are free to displace radially when torque converter 100 is rotated about axis 117.

Drive plate 138 is drivingly engaged with spring assembly 148 of damper 150. Spring assembly 148 is drivingly engaged with flange 152 which is, in turn, fixedly attached to output hub 120 by rivet 156, for example. Output hub 120 is engaged with an input shaft for a transmission (not shown) at spline 158. Therefore, when clutch 118 is engaged, torque is transferred from cover 104 through clutch 118 and damper 148 to the input shaft (not shown).

Figure 4:
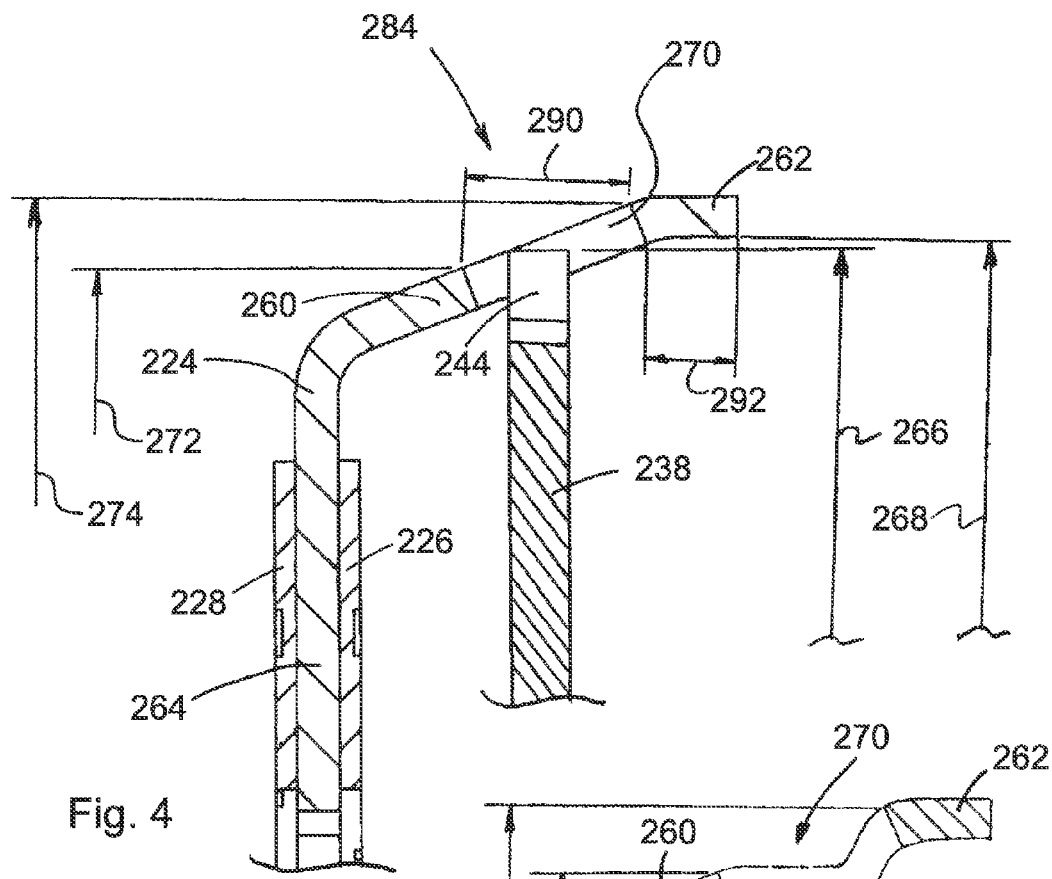
FIG. 4 is a partial section view of a drive ring and drive plate assembly according to an example aspect of the invention.
Figure 4A:
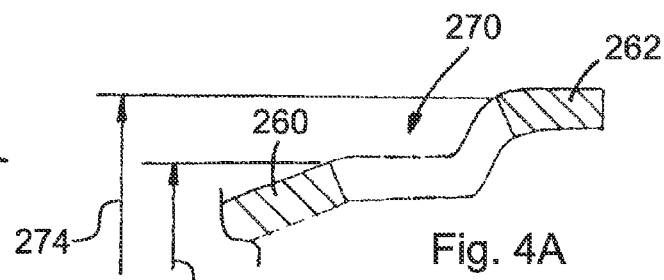
FIG. 4A is a partial section view of an alternative embodiment of the drive ring shown in FIG. 4.
Figure 4B:
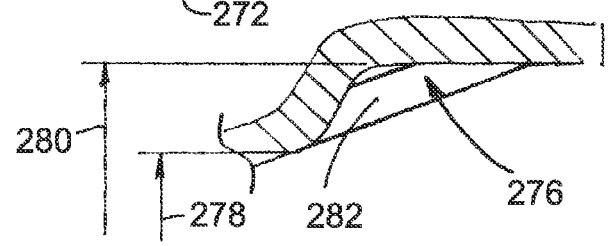
FIG. 4B is a partial section view of an alternative embodiment of the drive ring shown in FIG. 4.
Figure 5:
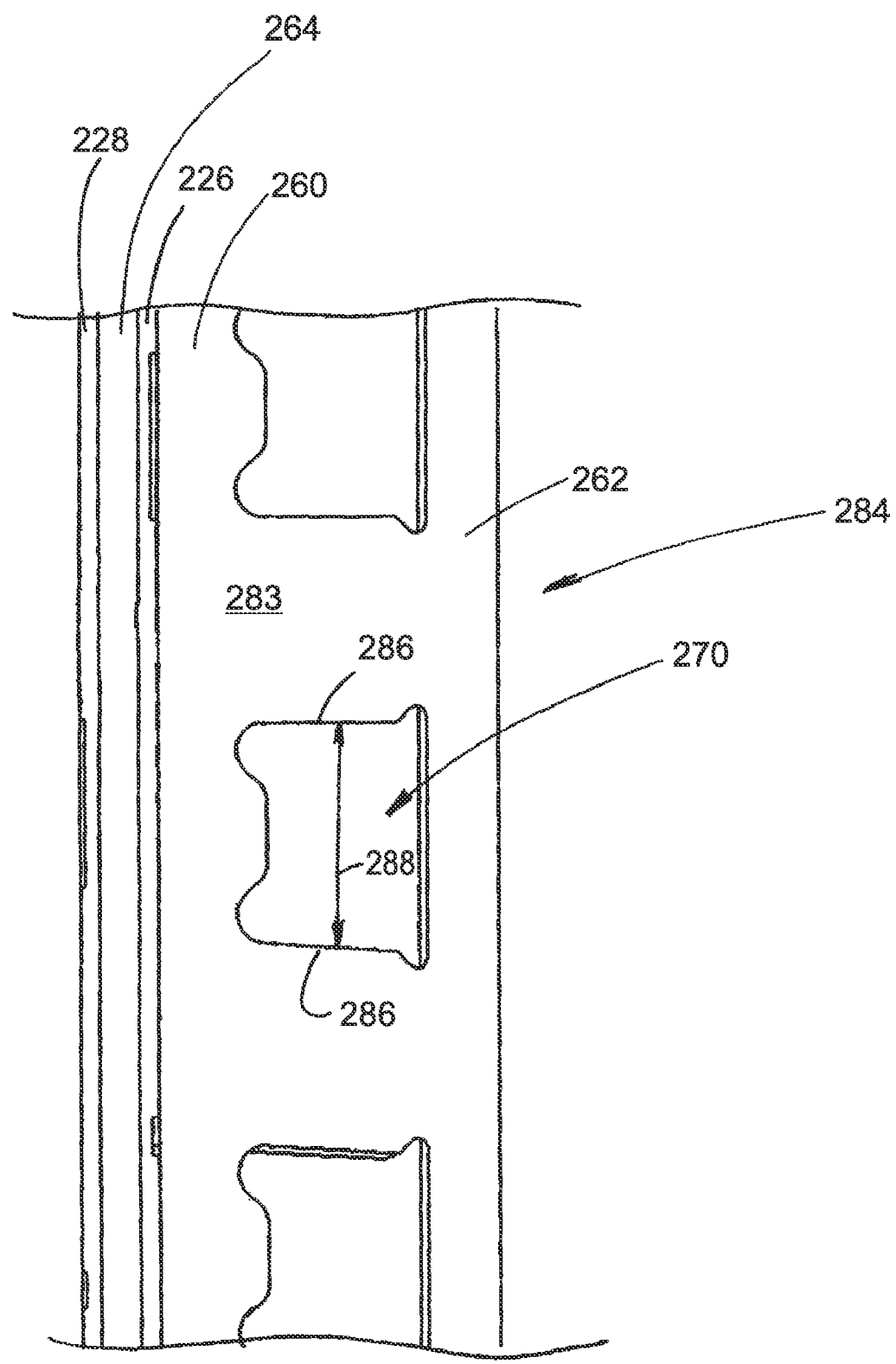
FIG. 5 is a radially outward view of the drive ring of FIG. 4.

The following description is made with reference to FIGS. 4-5. FIG. 4 is a partial section view of a drive ring and drive plate assembly according to an example aspect of the invention. FIG. 4A is a partial section view of an alternative embodiment of the drive ring shown in FIG. 4. FIG. 4B is a partial section view of an alternative embodiment of the drive ring shown in FIG. 4. FIG. 5 is a radially outward view of the drive ring of FIG. 4. The discussion of torque converter 100 in the description of FIGS. 2 and 3 is generally applicable to FIGS. 4 and 5, except as noted. In general, drive ring 224 and drive plate 238 are drivingly engaged together and function similar to drive ring 124 and drive plate 138 described supra, except as explained infra.

Drive ring 224 includes portion 260 and ring-shaped segment, or axial wall, 262. Portion 260 and ring-shaped segment 262 are continuous about their respective circumferences. That is, there are no gaps, for example, similar to gaps 146 in FIG. 3, in portion 260 or ring-shaped segment 262. Ring 224 includes radial friction wall 264. Portion 260 is proximate radial friction wall 264. In an example embodiment of the invention, friction rings 226 and 228 are bonded to radial friction wall 264. Drive plate 238 is disposed axially between radial friction wall 264 and ring-shaped segment 262.

Drive plate 238 includes radial tab 244 with outer diameter 266. Ring-shaped segment 262 has inner diameter 268. Diameter 268 is larger than diameter 266 leaving radial clearance between ring 262 and tab 244 so that drive plate 238 can be axially assembled with drive ring 224. In an example embodiment of the invention shown in FIGS. 4 and 4A, drive ring 224 includes slot 270. Slot 270 includes varying radial heights 272 and 274. That is, the radial height of slot 270 varies along axis 117 (FIG. 2).

In an example embodiment of the invention shown in FIG. 4B, drive ring 224 includes recess 276. Recess 276 includes varying radial depths 278 and 280. That is, the radial depth of recess 276 varies along axis 117 (FIG. 2). In an example embodiment of the invention, recess 276 includes lanced edge 282 for engaging tab 244 of drive plate 238. As shown, lanced edge 282 is depicted as sharing varying radial heights 278 and 280 with recess 276. It should be understood that other embodiments (not shown) may include independent varying radial heights for edge 282.

Slots 270 and connectors 283 between slots comprise tab engagement section 284 disposed between radial friction wall 264 and axial ring 262. Tab engagement section 284 is discontinuous around its circumference at slots 270. In an example embodiment of the invention shown in FIG. 4, engagement section 284 has a conical shape. Slots 270 each comprise a pair of radial walls 286 (FIG. 5). Walls 286 are circumferentially offset by distance 288. Distance 288 is larger than a circumferential width (not shown) of tab 244 for drive plate 238 allowing assembly of tab 244 with slot 270.

In an example embodiment of the invention, tab engagement section 284 comprises axial length 290 and axial ring 262 comprises axial length 292. Length 290 is greater than length 292.

The present invention also includes a method of forming a drive ring for a torque converter clutch comprising the steps of piercing a blank having an outer diameter, piercing an inner diameter out of the blank, punching a tab engagement slot at a predetermined distance inside of the outer diameter, and axially forming the drive ring so that a radial height of the slot varies in an axial direction.

Of course, changes and modifications to the above examples of the invention should be readily apparent to those having ordinary skill in the art, without departing from the spirit or scope of the invention as claimed. Although the invention is described by reference to specific preferred and/ or example embodiments, it is clear that variations can be made without departing from the scope or spirit of the invention as claimed.

What I claim is:

1. A torque converter clutch assembly comprising:
   a piston plate for engaging a clutch;
   a drive plate; and
   a drive ring drivingly engaged with the drive plate, the drive ring comprising:
      a continuous ring-shaped segment at an outer circumference of the drive ring; and
      a radial friction wall, wherein:
         the continuous ring-shaped segment forms a radially outermost end of the drive ring, the radially outermost end continuous in a circumferential direction; and,
         the drive plate is disposed axially between the radial friction wall and the ring-shaped segment.

2. The torque converter clutch assembly of claim 1 wherein the drive plate comprises at least one tab with an outer diameter and the ring-shaped segment comprises an inner diameter larger than the tab outer diameter.

3. The torque converter clutch assembly of claim 2 wherein the drive ring comprises at least one slot, wholly surrounded by the drive ring, for engaging the at least one drive plate tab.

4. The torque converter clutch assembly of claim 3 wherein the at least one slot has a radial height varying in an axial direction.

5. The torque converter clutch assembly of claim 2 wherein the drive ring comprises at least one recess for engaging the at least one drive plate tab.

6. The torque converter clutch assembly of claim 5 wherein a radial depth of the recess varies in an axial direction.

7. The torque converter clutch assembly of claim 5 wherein the at least one recess includes a lanced edge for engaging the at least one drive plate tab, the radial height of the lanced edge varying in an axial direction.

8. The torque converter clutch assembly of claim 2 wherein the drive ring comprises at least one friction ring bonded to the radial friction wall.

9. The torque converter clutch assembly of claim 2 wherein the drive ring comprises two friction rings disposed on axially opposing surfaces of the radial friction wall.

10. The torque converter clutch assembly of claim 1 wherein the drive ring includes a conically-shaped tab engagement section, including a plurality of slots:
    wholly surrounded by the drive ring; and
    disposed between the radial friction wall and the continuous ring-shaped segment for rotationally engaging a plurality of drive plate tabs.

11. A torque converter clutch assembly comprising:
    a piston plate for engaging the clutch;
    a drive plate including a plurality of radially outwardly projecting tabs; and
    a drive ring drivingly engaged with the drive plate, the drive ring comprising:
       a continuous ring-shaped segment at an outer circumference of the drive ring; and
       a radial friction wall, wherein:
          the continuous ring-shaped segment forms an edge of the drive ring extending furthest in an axial direction away from the radial friction wall, the edge continuous in a circumferential direction;
          the continuous ring-shaped segment includes a plurality of slots passing through the material forming the ring-shaped segment to connect oppositely facing surfaces of the drive ring and wholly surrounded by the material forming the ring-shaped segment;
          the plurality of radially outwardly projecting tabs are at least partially disposed in the plurality of slots; and,
          the drive plate is disposed axially between the radial friction wall and the ring-shaped segment.

12. A torque converter clutch assembly comprising:
    a piston plate for engaging the clutch;
    a drive plate including a plurality of radially outwardly projecting tabs; and
    a drive ring drivingly engaged with the drive plate, the drive ring comprising:
       a continuous ring-shaped segment at an outer circumference of the drive ring;
       a radial friction wall; and,
       a portion directly connecting the continuous ring-shaped segment and the radial friction wall, wherein:
          the continuous ring-shaped segment forms an edge of the drive ring extending furthest in an axial direction away from the radial friction wall, the edge continuous in a circumferential direction;
          the portion includes a plurality of recesses facing radially inward;
          the plurality of recesses does not pass through the material forming the ring-shaped segment and does not connect oppositely facing surfaces of the drive ring;
          the plurality of radially outwardly projecting tabs are at least partially disposed in the plurality of recesses; and,
          the drive plate is disposed axially between the radial friction wall and the ring-shaped segment.

* * * * *